United States Patent [19]

Wober et al.

[11] Patent Number: 5,563,718
[45] Date of Patent: Oct. 8, 1996

[54] IMAGE CODING BY USE OF DISCRETE COSINE TRANSFORMS

[75] Inventors: Munib A. Wober, Haverhill; Michael L. Reisch, Carlisle, both of Mass.

[73] Assignee: Polaroid Corporation, Cambridge, Mass.

[21] Appl. No.: 159,733

[22] Filed: Nov. 30, 1993

[51] Int. Cl.$^6$ ........................................... H04N 1/415
[52] U.S. Cl. ........................ 358/432; 358/433; 348/403
[58] Field of Search ................................. 358/426, 427, 358/432, 433; 348/403, 405, 409, 419, 425; 382/56, 248–250, 260–261; H04N 1/415, 1/417

[56] References Cited

U.S. PATENT DOCUMENTS

| | | | |
|---|---|---|---|
| 4,941,043 | 7/1990 | Jass | 358/133 |
| 5,001,559 | 3/1991 | Gonzales et al. | 358/133 |
| 5,142,380 | 8/1992 | Sakagami et al. | 358/432 |
| 5,168,375 | 12/1992 | Reisch et al. | 358/432 |
| 5,189,526 | 2/1993 | Sasson | 358/432 |
| 5,229,864 | 7/1993 | Moronaga et al. | 358/433 |
| 5,253,056 | 10/1993 | Puri et al. | 348/409 |
| 5,253,078 | 10/1993 | Balkanski et al. | 358/426 |
| 5,311,310 | 5/1994 | Jozawa et al. | 348/416 |

OTHER PUBLICATIONS

"Symmetric Convolution and the Discrete Sine and Cosine Transforms: Principles and Applications," Stephen A. Martucci, Doctoral Thesis, Georgia Institute of Technology, May 1993.

"Two–Dimensional Signal and Image Processing," Jae S. Lim, Prentice–Hall, Inc., 1990, pp. 653–654.

"JPEG Still Image Data Compression Standard," William B. Pennebaker and Joan L. Mitchell, Van Nostrand Reinhold, 1993, pp. 341–345.

"Multidimensional Digital Signal Processing," Dan E. Dudgeon and Russell M. Mersereau, Prentice–Hall, Inc. 1984, pp. 112–118.

G. Aharoni et al., "Local Cosine Transform—A Method for the Reduction of the Blocking Effect," J. Math. Imaging and Vision, 3 (1993), pp. 7–38.

H. S. Malavar et al., "Reduction of blocking effects in image coding with a lapped orthogonal transform," Proc. ICASSP '88, New York, 1988, pp. 781–784.

L. R. Rabiner et al., "Theory and Application of Digital Signal Processing," Prentiss–Hall, Englewood Cliffs, New Jersey, 1975, pp. 59–66.

G. Barnard et al., "Reducing the Block–Effect in Transform Image Coding," Proc. S. African Conf. on Commun. and Signal Process, 1989, IEEE Cat. No. 89TH0230-3, pp. 97–98, 100–101.

Primary Examiner—Kim Yen Vu
Attorney, Agent, or Firm—Joseph Stecewycz

[57] ABSTRACT

Image coding methods and apparatus employing discrete cosine transforms for supressing and/or reducing blocking artifacts using a JPEG file format. The methods can be implemented on JPEG hardware slightly modified to provide access to discrete cosine transform coefficients. Filtering techniques by which an overlap procedure for implementing the inventive methods are also disclosed.

11 Claims, 11 Drawing Sheets

IMAGE CODING BY USE OF DISCRETE COSINE TRANSFORMS

RELATED APPLICATIONS

This application is related to U.S. Pat. application Ser. No. 761,660 filed Sep. 18, 1991, now U.S. Pat. No. 5,168,375.

FIELD OF THE INVENTION

This invention relates to the coding of image data by use of discrete cosine transforms and, more particularly, to coding which suppresses or reduces blocking effects even at relatively high ratios of image data compression.

BACKGROUND OF THE INVENTION

Image Processing and Data Compression

Image processing is employed in various applications such as the electronic conversion of photographic images, the reproduction of graphical information in a printing operation, and the coding and subsequent reconstruction of digital image data in electronic communication systems.

In such applications it is normally required to handle extremely large amounts of data in encoding and reproduction operations, especially color images. As a result, it becomes necessary to use high rates of data transfer if the rate of image conversion and reconstruction is to be kept within acceptable bounds. Consequently, there continues to be much effort expended in finding methods to decrease the amount of data required to effect the processing desired without compromising the quality of the image transmitted or reproduced.

Image processing procedures can be conducted directly upon the picture data elements, or pixels. One of the most common image operations performed on images in the spatial domain, where pixel parameter value is specified as a function of its position with respect to other pixels, is convolution. Convolution operations are particularly common for smoothing boundaries between adjacent pixels or groups of pixels so that, once processed, the likelihood of the presence of visual discontinuities over the image is reduced. However, the penalty is an increase in computational intensity. In spite of this computational overhead, there remain circumstances where convolution procedures are essential.

Before a convolution operation is initiated, the numerical values representing image data are formatted into a matrix in which each of the matrix terms represents and describes a pixel from the original image. The particular type of processing, or filtering, to be performed on the image data is determined by the particular numerical values used as filter terms in the convolution operation. These filter terms are provided in a second matrix commonly denoted as the kernel matrix.

The filtering characteristic of a kernel matrix can be more precisely specified as the number of terms used for a kernel matrix is increased. However, implementation of the convolution procedure becomes more complicated and requires a significantly greater processing capability with correspondingly more processing time with a larger kernel matrix. Because convolution is performed on numerical terms representing pixels (i.e., image data), the operation is commonly designated as being performed in the spatial domain.

FIG. 1 shows the basic operating steps of a convolution performed in the spatial domain. This operation can be represented mathematically as follows:

$$h(i) = \sum_{j=0}^{N-1} s(j) \cdot k(i-j)$$

The original image data, here shown as H×V matrix 10, is convolved at operation 20 with an f×f spatial kernel matrix 12 to yield processed image data 14 in the spatial domain. To perform a convolution requires a series of multiplications followed by a summing operation for each processed term obtained. It can be appreciated that the computational effort expended increases geometrically as the sizes of the component matrices increases.

Processing Using Transform Methods

Reduced computation time may be realized when image data processing is performed in the frequency domain rather than in the spatial domain. Image data terms are converted into frequency coefficients by a matrix multiplication of the image date matrix by a suitable transform matrix. This conversion is commonly accomplished by utilizing an orthogonal transform such as a Fourier transform (FT) or a discrete cosine transform (DCT). To facilitate processing, the frequency-domain operations are performed on individual portions of the image-data matrix, and the resulting data are recombined into one matrix when the operations have been accomplished.

A commonly-used frequency-domain processing method, described in ISO Draft International Standard 10918-1, ¶3.3, adopted by the Joint Photographic Experts Group (JPEG), is shown in FIG. 1. To facilitate the sequence of processing operations to be undertaken in the frequency domain, H×V image-data matrix 10, containing pixel values $s_{y,x}$ from the original spatial image, is initially segmented into a blocked image-data set 16. Set 16 is a P'×Q' array of N×N image-data subset matrices 18, denoted by $t_{l,k}$ where $0 \leq x < (H-1)$ and $0 \leq y \leq (V-1)$, $0 < k < (P'-1)$ and $0 < l < (Q'-1)$.

P'=H/N, when H is an integral multiple of N
Q'=V/N, when V is an integral multiple of N
This segmentation of the image-data matrix is, in effect, a one-to-one mapping of each pixel value $s_{y,x}$ from image-data matrix 10 to one of the P'×Q' array of N×N image-data subset matrices $t_{l,k}$ 18.

Each image-data subset matrix 18 obtained by this segmentation operation is then processed as if it were a stand-alone matrix. Image-data subset terms $s_{y,x}$ are transformed, from image-data values in the spatial domain, into numerical values representing the image data in the frequency domain. The transform equation used as the DCT is actually for a discrete even cosine transform (DECT), hereinafter DCT, and is given by:

$$S(v,u) = \frac{1}{4} C_u C_v \sum_{i=0}^{7} \sum_{j=0}^{7} s(j,i) \cos \frac{(2i+1)u\pi}{16} \cos \frac{(2j+1)v\pi}{16}$$

for $0 \leq i \leq 7$ and $0 \leq j \leq 7$,
where S(v,u) represents DCT coefficients;
s(j,i) represents original image data points;

s'(j ,i) represents the reconstructed image data points;

$$C_u = \frac{1}{\sqrt{2}} \text{ for } u = 0;$$

$$C_u = 1 \text{ for } u \neq 0;$$

$$C_v = \frac{1}{\sqrt{2}} \text{ for } v = 0; \text{ and}$$

$$C_v = 1 \text{ for } \neq 0;$$

This is accomplished by transforming each image-data subset matrix $t_{l,k}$ by means of the DCT. The matrix terms $s_{y,x}$ are transformed in two dimensions in accordance with the following matrix operation given by:

$$[S]=[D][S][D]^T$$

to obtain a P'×Q' array 22 of DCT coefficient matrices $T_{l,k}$ 24. D is the DCT basis matrix. The terms $S_{v,u}$ in DCT coefficient matrices 24 are usually referred to as frequency coefficients. In most processing operations, these frequency coefficients can also be filtered at operation 26 by pointwise multiplication of each term $S_{v,u}$ in DCT coefficient matrix $T_{l,k}$ 24 with the reciprocal of the respective term $Q_{v,u}$ of quantization table 28. The terms resulting from this pointwise multiplication, $S_{v,u}/Q_{v,u}$, comprise a P'×Q' array 30 of N×N DCT coefficient product matrices $T'_{l,k}$ 32.

After filtering, the matrix terms, $S_{v,u}/Q_{v,u}$, are usually "rounded off," or quantized, by a method well understood in the art. Quantized terms, denoted by $Sq_{v,u}$, replace the terms in DCT coefficient product matrices $T'_{l,k}$ 32 to yield an H×V quantized DCT coefficient matrix 34. Those terms which remain after quantization represent information which has been compressed from the original image data set. These DCT coefficient terms are then encoded at 36 and transmitted or stored.

As the ratio of image compression is increased in such a process, an undesireable feature known as "blocking" becomes increasingly noticeable. This feature usually appears because the effect of data compression on a transformed block of image data differs slightly from the effect that the same process has on an adjacent block of image data. As a result, artificial intensity discontinuities may appear along the boundaries of adjacent image data blocks in the reconstructed image. Thus, data compression as normally performed is affected by the undesirable effects of blocking.

Two general approaches to reducing the blocking effect have been considered—as related in "Two-Dimensional Signal and Image Processing" (at p. 653) by Jae S. Lira, 1992. In one approach, the blocking effect is dealt with at the source. An example of this approach is the overlap method, which modifies the image segmentation process. A typical segmentation procedure divides an image into mutually exclusive regions. In the overlap method, the subimages are obtained with a slight overlap around the perimeter of each subimage. The pixels at the perimeter are coded in two or more regions. In reconstructing the image, a pixel that is coded more than once can be assigned an intensity that is the average of the coded values. Thus, abrupt boundary discontinuities caused by coding are reduced because of an averaging effect tending to reduce differences between boundaries in reconstructed subimages. While the overlap method tends to reduce blocking effects, some pixels are coded more than once, and this increases the number of pixels coded. This increase shows why overlap of two or more pixels has not been considered very useful. In image coding, however, the cost of overlapping subimages is an increase in the number of computations and more seriously, a potential increase in the required bit rate if the overlapped, encoded image is transmitted. An overlap of more than one pixel has thus seldom been considered in DCT image coding.

Quantization using the JPEC standard compression process causes blocking because there is no overlapping of image data and no "sharing" of data information between adjacent blocks of dam. As a consequence, the problem of encountering blocking within the JPEG format continues to persist.

Therefore, it is an object of the present invention to provide a method for achieving relatively high rates of data compression without incurring blocking artifacts.

It is a further object of the present invention to provide a method for performing filtering without incurring blocking effects.

It is a further object of the invention to provide a method for quantifying the factors responsible for the generation of blocking artifacts, such that the occurrence can be controllably suppressed or eliminated.

Other objects of the invention will, in part, appear hereinafter and, in part, be apparent when the following derailed description is read in connection with the drawings.

SUMMARY OF THE INVENTION

The present invention comprises a process and a system in which the processing steps take place in the frequency domain. The invention is based on the observation that (1) the method of convolving a spatial-domain kernel with an image-data matrix may be replaced by a pointwise multiplication of the DECT of subsets of the image-dam matrix with the DOCT of the kernel if the image-data subsets overlap one another, and (2) the amount of overlap necessary to suppress the blocking effect is determined by the characteristic of the particular frequency matrix utilized.

Derivation of these frequency-domain coefficients is accomplished by means of a discrete even cosine transfer (DECT) of the spatial-domain image data. Prior to transformation, the image data is reformatted, by means of a one-to-many mapping of each image datum into an array of image-data submatrices. This mapping operation, which produces terms common to more than one submatrix, is commonly referred to as "overlapping" of the image data. The processing of frequency coefficients in the frequency domain is accomplished by means of a filter matrix or by a filter matrix which has been derived from a spatial-domain kernel matrix. The characteristics of the frequency matrix provide criteria for determining the amount of overlap to be used to avoid blocking artifacts. Processed coefficients in JPEG format may be transmitted or stored using standard JPEG hardware or its equivalent after unoverlapping. Subsequently, these coefficients can undergo the inverse sequence of operations by which the original image-data matrix was processed, to yield the original image data.

The effects of blocking are suppressed for various levels of image data compression and compression levels of from 20:1 to 100:1 can be realized while maintaining similar or equivalent quality levels.

The invention provides for a major saving in electronic circuitry by use of existing JPEG array transform circuitry modified to provide access to the DCT and the Inverse Discrete Cosine Transform (IDCT), or by use of an equivalent digital signal processor. Therefore, in any electronic signal processing system which incorporates JPEG (or MPEG) compression equipment, the invention can be practiced by use of available array transform circuitry. Further-more, since the JPEG cosine transformer operates at great speed, the signal processing of the invention can be accomplished rapidly. It is also possible to implement the invention by way of software adapted for use with general-purpose computers.

BRIEF DESCRIPTION OF THE DRAWINGS

The objects and features of the present invention will become more apparent from the consideration of the general description given above and the detailed description of the preferred embodiments given below, taken in conjunction with the accompanying drawings in which.

DETAILED DESCRIPTION OF THE INVENTION

General Overview Of Procedure

Figure 1:
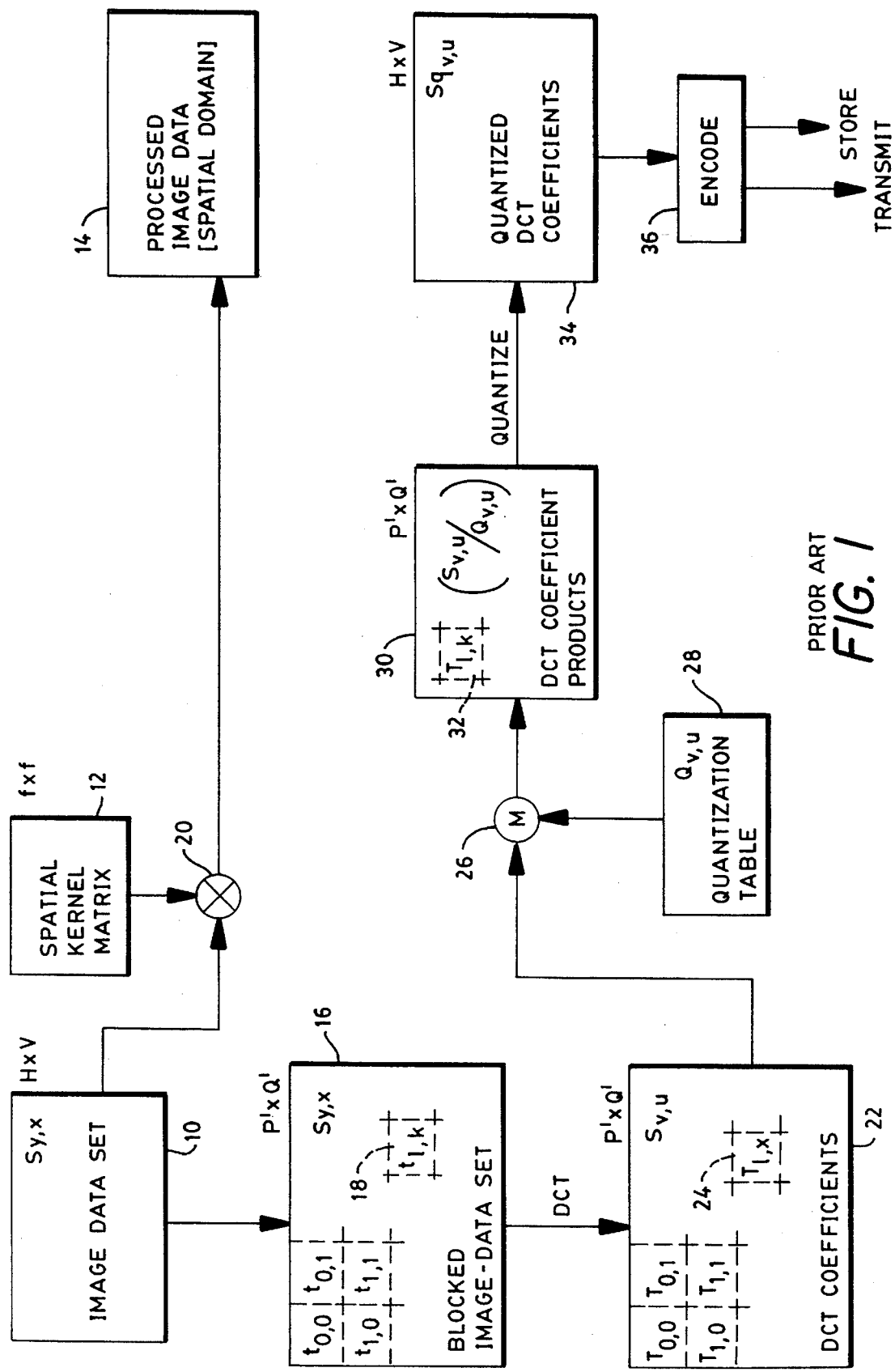
FIG. 1 is a block diagram of a conventional method of processing image data.
Figure 2:
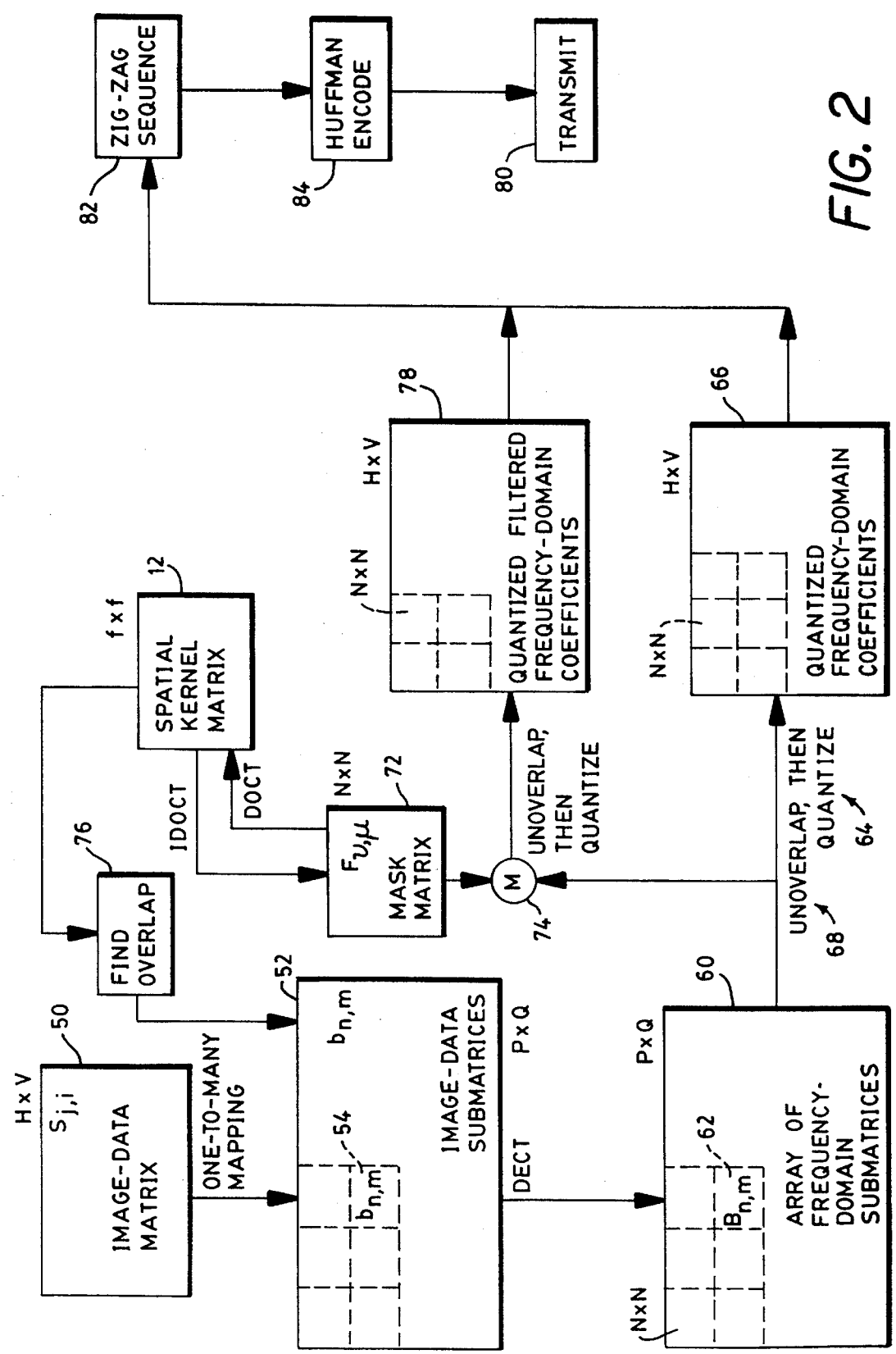
FIG. 2 is a block diagram illustrating the processing sequence performed on image data as taught by the present invention.

FIG. 2 is an overview of the general steps taken to perform the image coding procedure of the invention. Image coding in the present invention is performed in a manner similar to the conventional method as described above. That is, the image-data matrix is processed in portions, to facilitate the coding procedure, and the results are then recombined to yield the desired information. The coding operation can be performed in more than one way: (i) the steps described below can be performed on a first portion of the image-data matrix before being performed on a second portion of the image-data matrix, (ii) one step can be performed on all portions of the image-data matrix before a subsequent step is initiated, or (iii) a combination of (i) and (ii) can be used.

There is shown in FIG. 2 an H×V image-data matrix 50 containing image-data terms $s_{j,i}$. A mapping operation is used to generate a P×Q array 52 of N×N image-data submatrices 54 denoted as $b_{n,m}$. By means of this operation, each image datum $s_{j,i}$ is multiply-mapped into more than one image-data submatrix 54. This process results in an array in which resulting submatrices 54 have terms in common with one another. Preferably, each submatrix 54 has at least one row or one column of data which is identical to a row or column of data present in an adjacent submatrix 54.

Each submatrix 54 is then transformed to yield array 60 of N×N frequency-domain submatrices 62, each denoted as $B_{n,m}$, and each submatrix 62 having terms denoted by $S_{v,\mu}$. These submatrix terms $S_{v,\mu}$ are derived from the original image data terms $s_{j,i}$ by means of the DECT equation:

$$S(v,u) = \frac{1}{4} C_u C_v \sum_{i=0}^{7} \sum_{j=0}^{7} s(j,i) \cos \frac{(2i+1)u\pi}{16} \cos \frac{(2j+1)v\pi}{16}$$

for $0 \leq \mu \leq 7$ and $0 \leq v \leq 7$. This particular expression of the DECT equation, applicable to 8×8 submatrices, is intended for convenience of illustration only and is not meant to limit the application of the inventive method.

The set of terms $\{s_{j,i}\}$ used in the derivation is determined by the submatrix 54 selected for the derivation. The terms $S_{v,\mu}$ may be either fixed-point or floating-point values as a result of the above matrix multiplication. Array 60 is unoverlapped at 68 by a process to be explained in further detail below. These terms are then quantized at 64 to produce quantized frequency-domain terms, as is well-known in the art, from which H×V matrix 66 of quantized frequency-domain coefficients is obtained.

In a preferred embodiment, frequency-domain submatrices 62 are pointwise multiplied by mask matrix 72 at operation 74 before the operations of quantization or unoverlapping of array 60 are performed. The terms $F_{v,\mu}$ of mask matrix 72 consist of frequency coefficients and may be provided in the form of mask matrix terms. Alternatively, a spatial-domain kernel matrix 12 may be provided from which mask matrix terms $F_{v,\mu}$ can be derived. In the inventive method, the size of kernel matrix 12 is used at operation 76 to determine the amount of overlap necessary to suppress blocking effects. If a mask multiply operation has been performed, then the result is quantized and unoverlapped, as described above, to yield a matrix 78 of quantized filtered frequency-domain coefficients.

These blocks of coefficients in either matrix 66 or matrix 78 may be further encoded for transmittal at 80. Before encoding, the matrix frequency-domain coefficients are grouped into appropriately-sized blocks (e.g., 8×8 for JPEG) according to the requirements of the processing standard utilized. Preferably, zig-zag sequencing at 82, well-known in the art, is performed on the blocks of coefficients, and then the sequence is Huffman encoded at 84 prior to transmittal, as is also well-known in the art.

Figure 9:
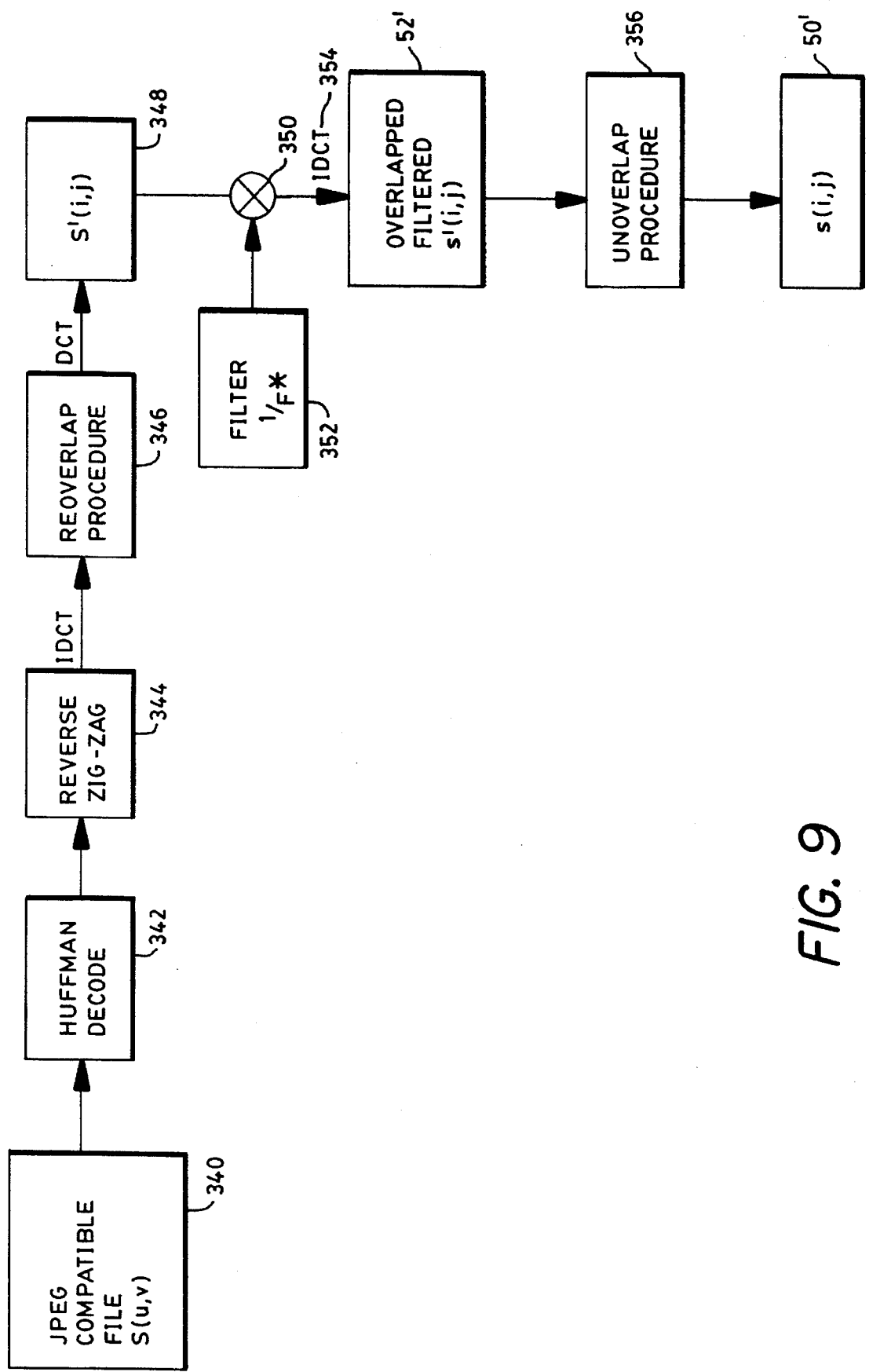
FIG. 9 is a block diagram showing a method for regenerating spatial image data after the processing procedure shown in FIG. 2.

After transmittal, the H×V image-data matrix 50 of FIG. 2 can be recovered by performing the above sequence in reverse, as shown in FIG. 9. A received file, such JPEG-compatible file 340 is Huffman decoded at block 342 and the resulting data stream is reverse zig-zagged at block 344. The resulting frequency coefficients are transformed with a IDCT to produce spatial terms at block 346 which are then reoverlapped in accordance with the right-side sequence of operations shown in FIG. 10. These spatial terms 314 are then transformed back into frequency coefficient terms, also denoted as S'(j,i) in block 348 of FIG. 9. If a filtering operation had been performed on the image data, multiplication of terms S'(j,i) by inverse filter 352 is next performed at 350. The resulting terms are then transformed back into spatial terms by applying an IDCT at 354 to produce overlapped set 52' of terms denoted by s'(j,i). These terms correspond to the terms of matrix 52 in FIG. 2. After an unoverlap has been performed at block 356 in accordance with the procedure shown in FIG. 10, spatial image data 50' is obtained, which corresponds to the original spatial image data contained in matrix 50 of FIG. 2. The following differences are noted between the processing of data for transmittal or storage as shown in FIG. 9 and, and the recovery process as shown in FIG. 9 and described above:

a. re-overlapping matrix 78 or 66 at block 346 in FIG. 9 differs from the unoverlapping operation 64 in FIG. 2, as explained below;

b. the filtering operation 64 in FIG. 2 performed to produce matrix 78 is undone with multiplication at 350 by reciprocal of filter 352 in FIG. 9;

c. matrix 52 in FIG. 2 is obtained from matrix 60 by multiplication with an inverse discrete even cosine transform (IDECT) at 354 in FIG. 9, given by the following expression:

$$s'(j,i) = \frac{1}{4} \sum_{\mu=0}^{7} \sum_{\nu=0}^{7} C_\mu C_\nu S(\nu,\mu) \cos\frac{(2i+1)\mu\pi}{16} \cos\frac{(2j+1)\nu\pi}{16}$$

for $0 \leq i \leq 7$ and $0 \leq j \leq 7$,
where $S(\nu,\mu)$ represents formatted DCT coefficients;
$s'(j,i)$ represents the processed image data;

$$C_\mu = \frac{1}{\sqrt{2}} \text{ for } \mu = 0;$$

$$C_\mu = 1 \text{ for } \mu \neq 0;$$

$$C_\nu = \frac{1}{\sqrt{2}} \text{ for } \nu = 0; \text{ and}$$

$$C_\nu = 1 \text{ for } \neq 0;$$

DETAILED STEPS

Mapping

Figure 3:
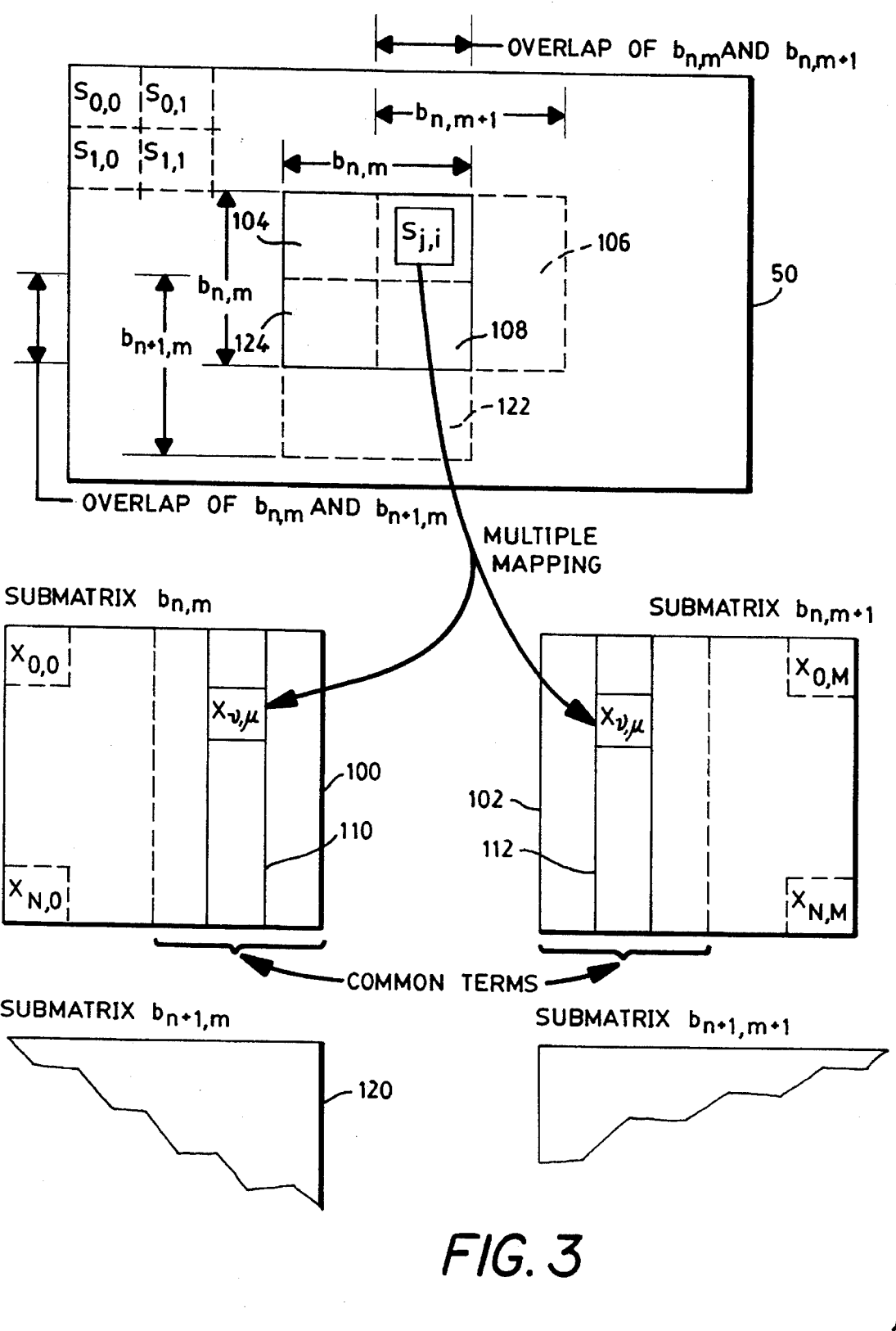
FIG. 3 is a diagram the mapping of image data into an array of submatrices as part of the processing sequence of FIG. 2.

A more detailed description of the mapping process shown in FIG. 2 is provided in FIG. 3. Image-dam submatrices 100 and 102, designated as $b_{n,m}$ and $b_{n,m+1}$ respectively, have been generated from image-dam matrix 50 as in FIG. 2. Each term $s_{j,i}$ of matrix 50 has been mapped into one or more of the P×Q image dam submatrices 54, denoted by $b_{n,m}$, where $$0 \leq m \leq (P-1); 0 \leq n \leq (Q-1).$$

As stated above, the entire mapping operation need not be completed before subsequent processing steps can begin on those submatrices already generated. In FIG. 3, submatrix 100 is adjacent to submatrix 102 within row "n" of P×Q array 52 of FIG. 2. The set of terms $\{x_{\nu,\mu}\}$ in submatrix $b_{n,m}$, where $0 \leq \mu,\nu \leq (N-1)$, corresponds to the image-dam matrix set of terms $\{s_{j,i}\}$ within square region 104, shown in solid lines, and the term set $\{x_{\nu,\mu}\}$ in submatrix $b_{n,m+1}$ corresponds to image-dam matrix term set $\{s_{j,i}\}$ within square region 106, shown in long dashed lines. Image-dam terms $s_{j,i}$ lying within area 108 in which the two square regions overlap one another are mapped into both submatrices 100 and 102. It can be seen that the terms in column 110 of submatrix 100 are the same as the terms in column 112 of submatrix 102. The mapping process generates submatrices having at least one column in common with an adjacent submatrix lying in the same row of P×Q array 52.

A similar relationship exists between adjacent submatrices lying in the same column of P×Q array 52. The term set $\{x_{\nu,\mu}\}$ for submatrix 120, designated as $b_{n+1,m}$ corresponds to image-dam matrix term set $\{s_{j,i}\}$ within square region 122, shown in short dashed lines. Image-dam terms $s_{j,i}$ lying within area 124 in which square region 122 overlaps square region 104 are mapped into both submatrices $b_{n+1,m}$ 120 and $b_{n,m}$ 100. It can be seen that submatrices 120 and 100 will have one row or more containing terms common to each submatrix. The mapping process thus also generates submatrices having at least one row in common with an adjacent submatrix lying in the same column of P×Q array 52.

The set of terms $\{x_{\mu,\nu}\}$ of any image-dam submatrix $b_{n,m}$ can be derived from the image-dam set $\{s_{j,i}\}$ by means of a stepping-increment integer $\Delta$. This integer $\Delta$ corresponds to the number of rows or columns to be "skipped," after one square region has been used to derive terms for one submatrix, and before the next square region is defined from which image-data matrix terms are mapped into an adjacent submatrix. From FIG. 3, it can be seen that $\Delta$ is related to the amount of overlap by the expression $$\Delta = (N - \text{overlap}).$$

The set of terms $\{x_{\mu,\nu}\}$ of the image-dam submatrix in the p-th column and the q-th row of said P×Q array are derived from the terms $s_{j,i}$ in the image-data set according to the generating equation:

$$x_{\nu,\mu} = s_{\nu+q\alpha,\mu+p\Delta}$$

where $0 \leq p \leq (P-1)$ and $0 \leq q \leq (Q-1)$.

Figure 4:
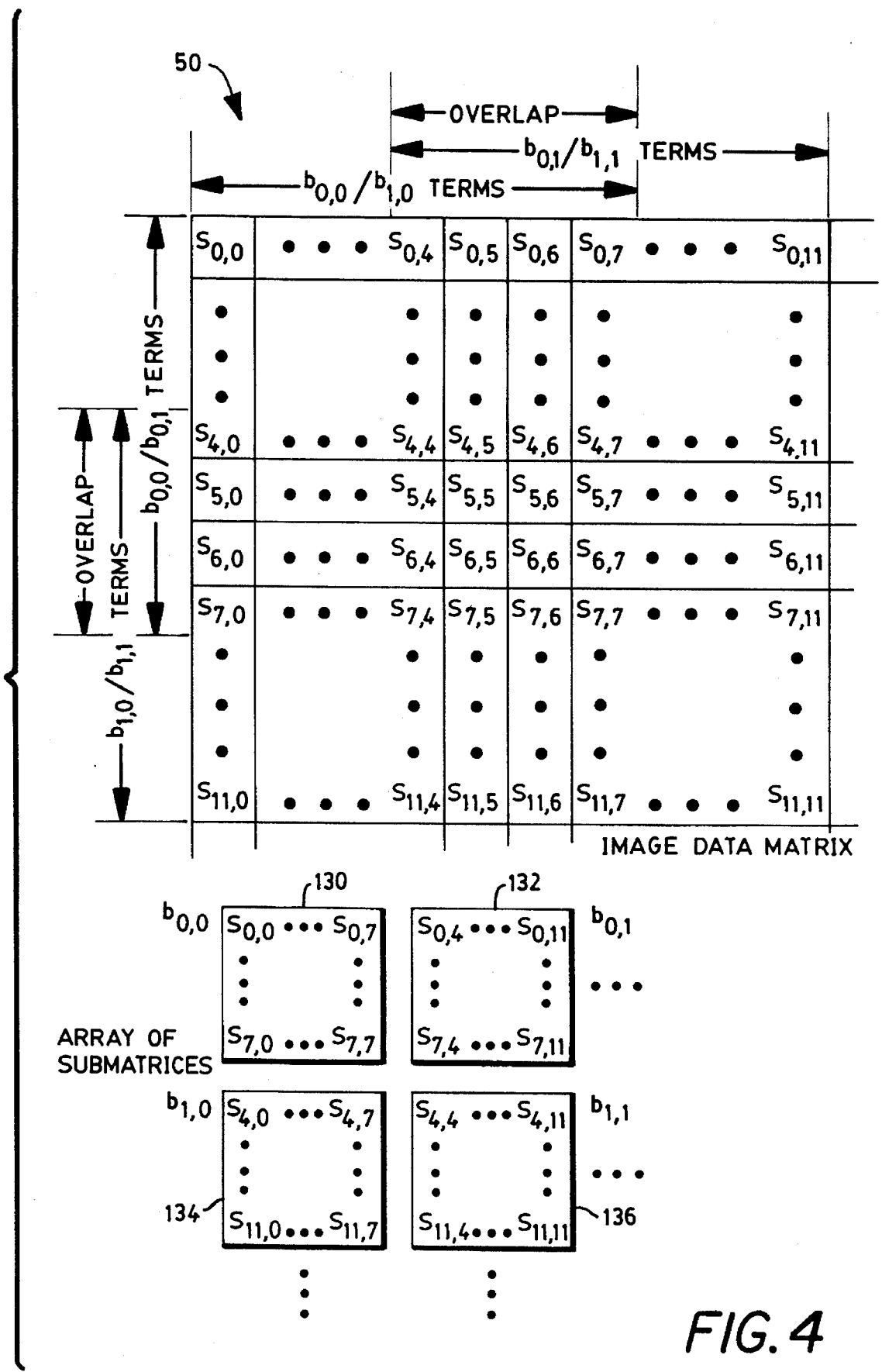
FIG. 4 illustrates the mapping process of FIG. 3 in which 8×8 submatrices are derived.

There is shown in FIG. 4 four adjacent submatrices: 130, 132, 134, and 136 designated as $b_{0,0}$, $b_{1,0}$, and $b_{1,1}$ respectively. The terms $x_{\nu,\mu}$ within these submatrices were mapped from image-data matrix 50 in accordance with the equation above. In a preferred embodiment, the size of the generated submatrices is 8-pixels by 8-pixels, a format which is compatible with hardware meeting the JPEG standard. In the example shown, adjacent submatrices have been overlapped by four rows or four columns of image data. Submatrices $b_{0,0}$ and $b_{0,1}$ have four columns containing common terms—those columns headed by terms $s_{0,4}$ through $s_{0,7}$.

The image-data submatrices in the next row of the P×Q array are derived in the same manner as the submatrices in the previous row. Since the overlap process operates in the vertical direction as well as the horizontal, the upper rows of each submatrix have terms $x_{\nu,\mu}$ in common with the bottom four rows of the submatrices in the first row of the array. In the example shown, submatrices $b_{0,0}$ and $b_{1,0}$ overlap by four rows. Four adjacent rows in the two submatrices contain common terms—those rows beginning with the terms $s_{4,0}$ through $s_{7,0}$. This process is continued until all possible submatrices have been generated by means of the generating equation.

However, as can be seen, not all the image-data matrix terms have been mapped into four submatrices. Image-data term $s_{0,0}$, for example, is mapped only into submatrix $b_{0,0}$, and image-data term $s_{0,4}$ is mapped only into submatrices $b_{0,0}$ and $b_{0,1}$. In a preferred embodiment, additional submatrices are generated by which all terms in the image-data matrix are mapped into multiple submatrices. These additional submatrices include the four "corner" submatrices of the array, and the other "border" submatrices lying between the four "corner" submatrices.

Figure 5:
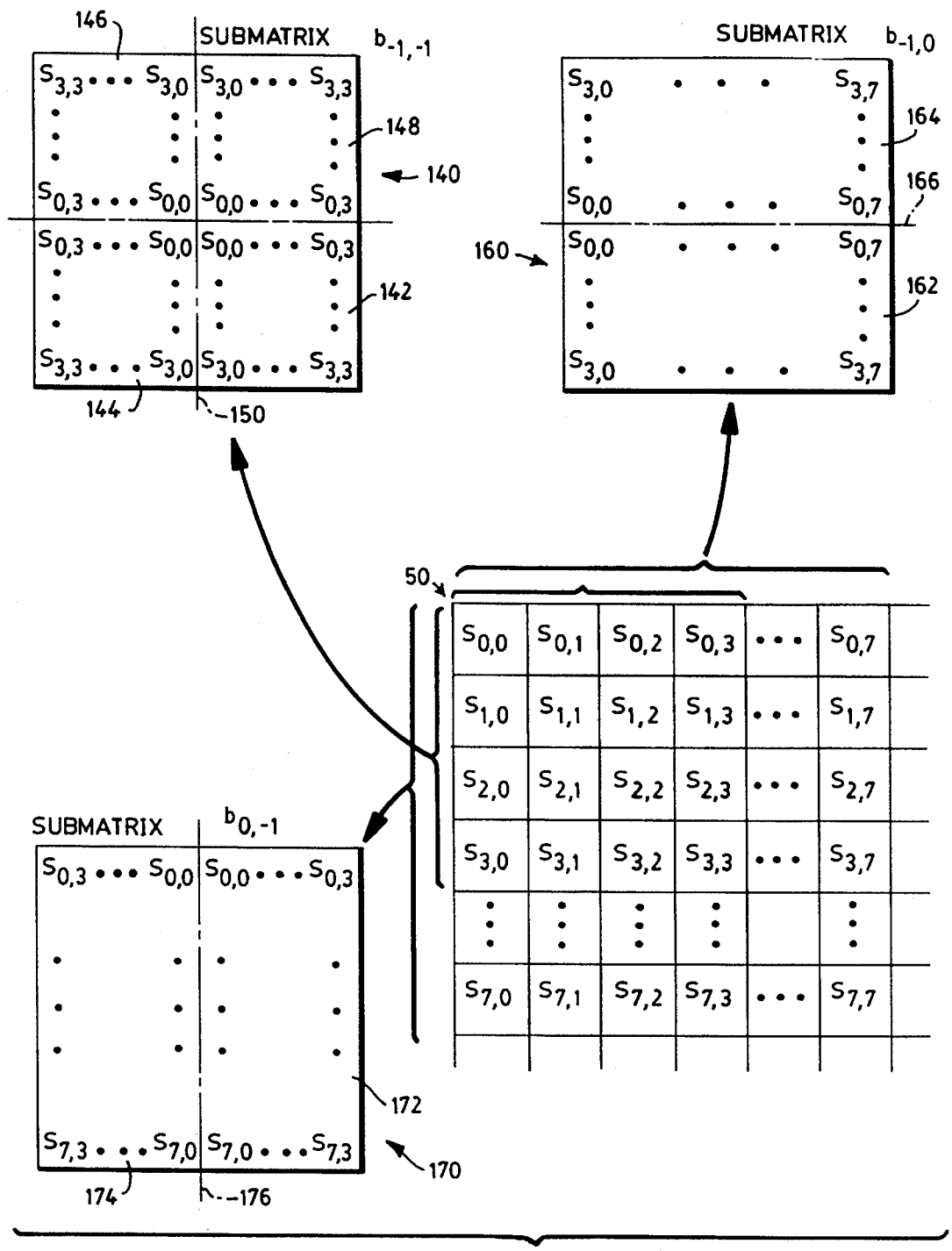
FIG. 5 is a diagram illustrating generation of boundary submatrices comprising the array of FIG. 3.

In the example at hand, these "corner" and "border" submatrices of the P×Q array, are formed as shown in FIG. 5. A "corner" submatrix 140, denoted as $b_{-1,-1}$, is formed by mapping the sixteen image-data matrix terms $s_{0,0}$ through $s_{0,3}$, $s_{1,0}$ through $s_{1,3}$, $s_{2,0}$ through $s_{2,3}$, and $s_{3,0}$ through $s_{3,3}$ into the same relative positions of the rightmost lower quadrant 142 of submatrix $b_{-1,-1}$. The other three quadrants 144, 146, and 148 each contain the same sixteen image-data terms, mapped in such a relationship that submatrix $b_{-1,-1}$ is symmetrical both across its vertical centerline 150 and across its horizontal centerline 152. The other three "corner" matrices are formed in a similar manner—by multiply mapping image-data matrix terms from the respective corners of image-data matrix 50.

A "row-border" submatrix 160, designated as $b_{-1,0}$, is formed by mapping the first eight image-data terms from each of the top four rows of matrix 50—that is, $s_{0,0}$ through $s_{0,7}$, $s_{1,0}$ through $s_{1,7}$, $s_{2,0}$ through $s_{2,7}$, and $s_{3,0}$ through $s_{3,7}$—into the same four relative positions of lower half 162 of submatrix $b_{-1,0}$. The terms for top half 164 of submatrix $b_{-1,0}$ are these same rows placed in reverse sequence such that submatrix $b_{-1,0}$ is symmetrical about its horizontal centerline 166. That is, the first and eighth rows are identical, as are the second and seventh, the third and sixth, and the fourth and fifth. The remaining "row-border" submatrices in array 52 are derived in a similar manner.

A "column-border" submatrix 170, designated as $b_{0,-1}$, is formed by mapping thirty two image-data matrix terms— eight each from the the columns beginning with terms $s_{0,0}$, $s_{0,1}$, $s_{0,2}$, and $s_{0,3}$—into the same relative positions in the right half 172 of submatrix $b_{0,-1}$. The terms for left half 174 of submatrix $b_{0,-1}$ are these same rows placed in reverse sequence such that submatrix $b_{0,-1}$ is symmetrical about its vertical centerline 176. The remaining "column-border" submatrices in array 52 are derived in a similar manner.

It should be noted that, in one aspect of the inventive procedure, every image datum $s_{j,i}$ has been mapped into four different adjacent submatrices by means of the overlapping operation performed prior to transformation into the frequency domain. When image-data terms $s_{j,i}$ are thus repeated, or overlapped, between adjoining submatrices, the likelihood of blocking effects is lessened as discussed above. This overlapping is necessary because subsequent processing is performed sequentially, on individual submatrices, rather than being performed on the entire image-data set as a whole.

Transformation into Frequency Coefficients

Each term $x_{v,\mu}$ of the image-data submatrices is next transformed into a frequency-domain submatrix term $X_{v,\mu}$ by applying the DECT:

$$X(v,\mu) = \frac{1}{4} C_\mu C_v \sum_{i=0}^{7} \sum_{j=0}^{7} x(j,i) \cos\frac{(2i+1)\mu\pi}{16} \cos\frac{(2j+1)v\pi}{16}$$

for $0\leq\mu\leq7$ and $0\leq v\leq7$ if submatrix size has been selected as 8×8.

This transformation is accomplished by performing the following matrix multiplication with each of the image-data submatrices:

$$[B_{v,\mu}] = [D][b_{v,\mu}][D^T]$$

where D is the DECT basis matrix.

Derivation of the Mask Matrix from the Spatial Kernel

Figure 6:
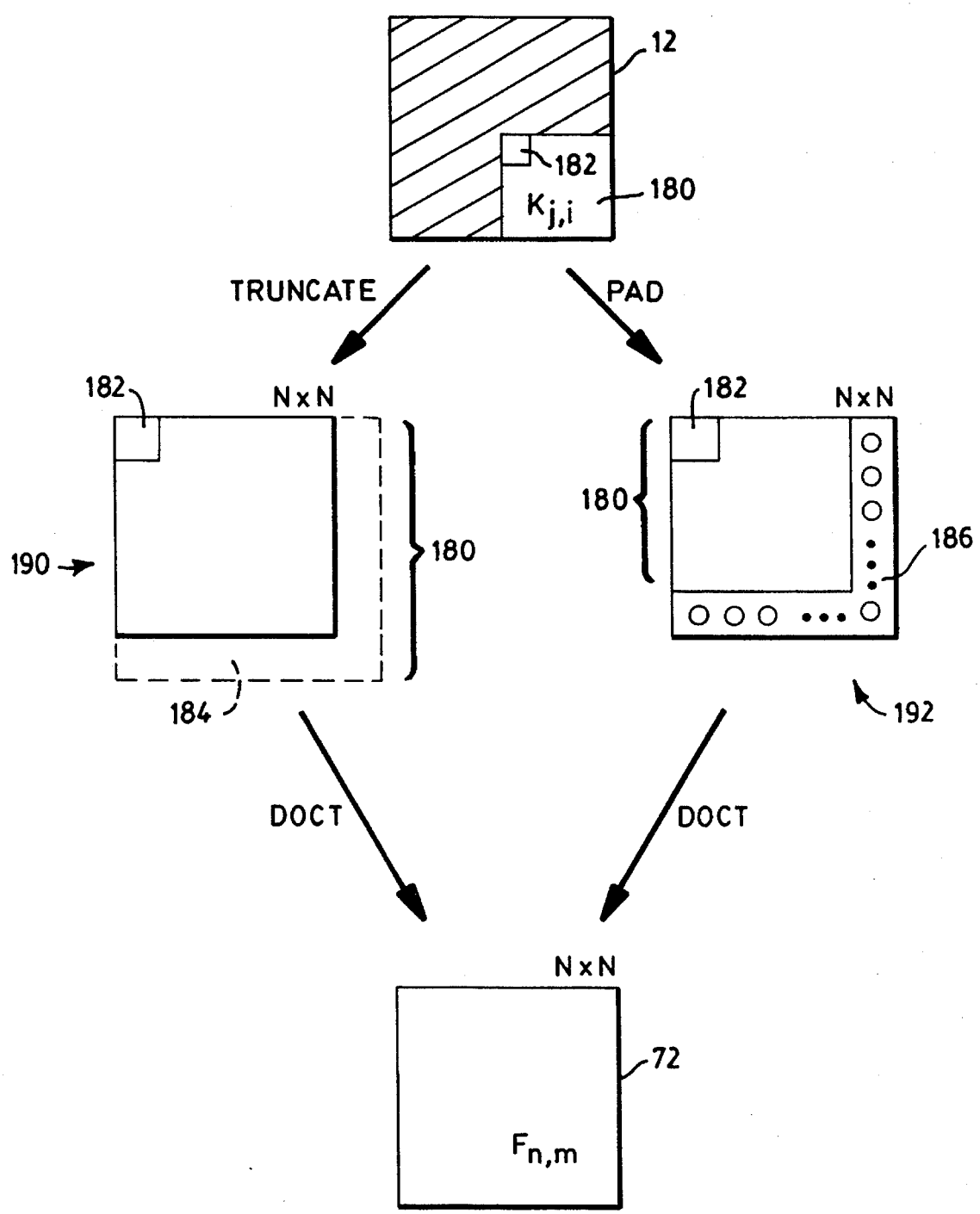
FIG. 6 illustrates the steps taken to format a mask multiply matrix from a kernel matrix as part of the processing sequence of FIG. 2.

Derivation of mask matrix 72, of FIG. 2, from spatial kernel matrix 12 is illustrated in FIG. 6. The terms contained in the lower righthand quadrant 180 of spatial kernel 12 are selected from which an N×N matrix may be formed. If kernel matrix 12 is an odd symmetrical matrix, the center term 182 is included in quadrant 180.

If quadrant 180 is N×N in size, the terms $k_{j,i}$ of quadrant 180 are transformed into frequency terms $F_{v,\mu}$ by means of the discrete odd cosine transform (DOCT).

A discrete odd cosine transform (DOCT) is applied to the matrix thus obtained, where $$F(n,m) = 4 \sum_{i=0}^{N-1} \sum_{j=0}^{M-1} d_i d_j k_P(j,i) \cos\frac{i\mu\pi}{N} \cos\frac{jv\pi}{M}$$

for $0\leq m\leq N-1$ and $0\leq n\leq N-1$, where $k_p(j,i)$ is the two dimensional padded kernel matrix;

N is the number of elements of $k_p(j,i)$ in the first dimension;

M is the number of elements of $k_p(j,i)$ in the second dimension;

$d_i=\frac{1}{2}$ for i=0;

$d_i=1$ for i=1, 2, . . . (N−1);

$d_j=\frac{1}{2}$ for j=0;

$d_j=1$ for j=1, 2, . . . (M−1);

i, j, μ, v, m, n are integers; and $k_p(j,i)=0$ for |i| or |j|>(k−1)/2 and k is the kernel size.

If quadrant 180 is larger than an N×N matrix, the extra row(s) and column(s) 184 are discarded, retaining term 182 as shown to produce N×N matrix 190. If quadrant 180 is smaller than an N×N matrix, additional row(s) and column(s) 186 are padded with zeroes to produce N×N matrix 192. Either matrix 190 or matrix 192 is then transformed, as above, by means of the DOCT to produce mask matrix 72:

$$[F] = [D_o][k][D_o]^T$$

Derivation of the Spatial Kernel from the Filter Matrix

Figure 7:
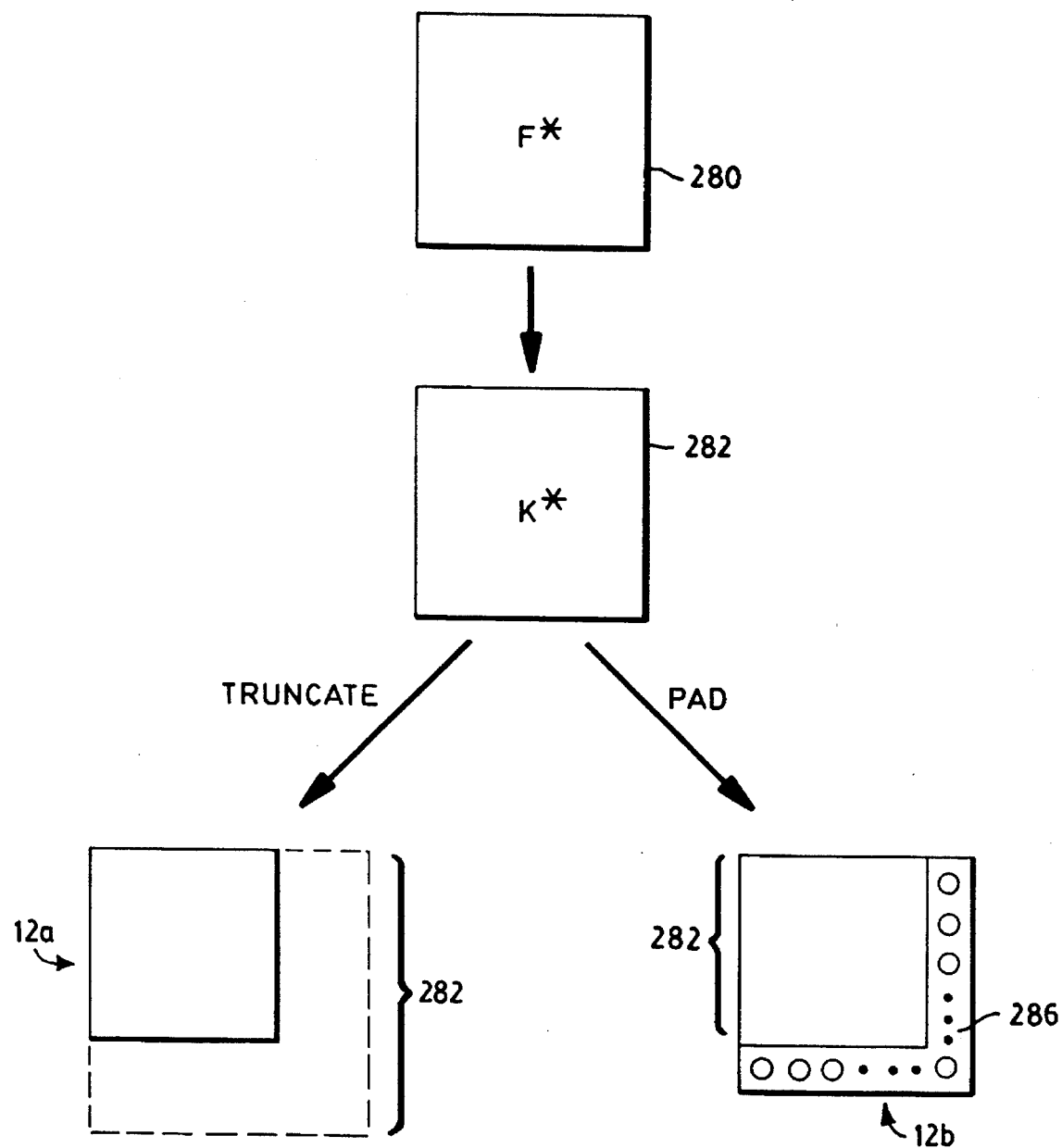
FIG. 7 illustrates the steps taken to format a kernel matrix from a mask multiply matrix as part of the processing sequence of FIG. 2.

It is usually more convenient to design a filter by working with frequency coefficients, in the frequency domain, than it is to work with kernel values in the spatial domain. But, since determination of an overlap value requires evaluation of the kernel matrix, it is necessary to derive an equivalent kernel matrix when a mask multiply filter matrix is provided. FIG. 7 illustrates the steps taken to format a kernel matrix from a mask multiply, or filter, matrix 280. Filter matrix 280 is converted into an equivalent kernel matrix 282 by means of an IDOCT. If the resulting kernel matrix 282 is larger than an N×N matrix, a truncation is performed to yield an N×N matrix. This is accomplished by deleting one or more rows and columns from kernel matrix 282 to produce a truncated kernel matrix 12a. If the resulting kernel matrix 282 is smaller than an N×N matrix, a padding operation is performed. This is accomplished by adding one or more rows and columns of zeroes to kernel matrix 282 to produce a padded kernel matrix 12b. In either case, the amount of overlap required to perform image coding without the occurence of the blocking effect is determined by evaluation of equivalent kernel matrix 282.

Figure 8:
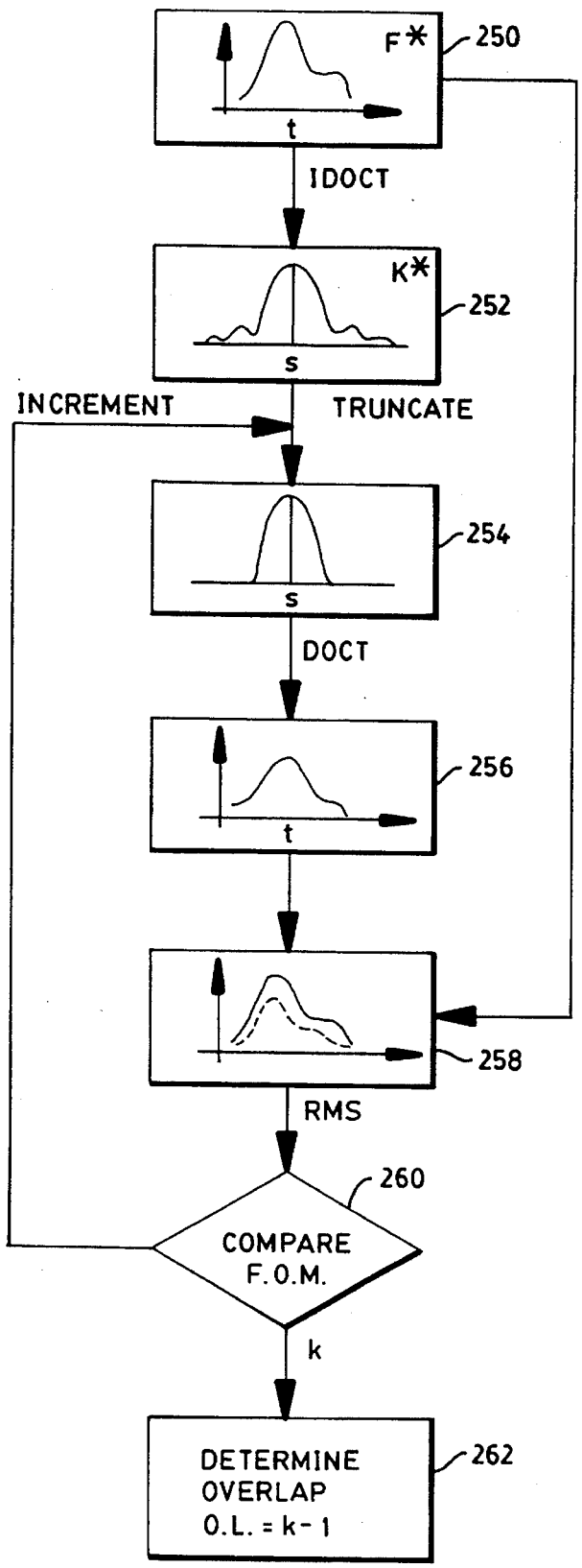
FIG. 8 is a block diagram showing a method for determining overlap.

Referring now to FIG. 8, this procedure is as follows:

The frequency-coefficient terms in filter matrix F* in block 250 are converted to spatial-domain values K* by multiplication as follows:

$$[K^*] = [D_0^T]^{-1} [F^*] [D_0]^{-1}$$

where $D_0$, which is a DOCT, is defined as follows:

$$k_p(j,i) = 4 \sum_{n=0}^{N-1} \sum_{m=0}^{M-1} d_i d_j F(n,m) \cos \frac{ni\pi}{N} \cos \frac{mj\pi}{M}$$

for $0 \leq m \leq N-1$ and $0 \leq n \leq N-1$,
where $h_p(j,i)$ is the two dimensional padded kernel matrix;

N is the number of elements of $h_p(j,i)$ in the first dimension;

M is the number of elements of $h_p(j,i)$ in the second dimension;

$d_i=1$ for $i=0$;
$d_i=2$ for $i=1, 2, \ldots$ (N−1);
$d_j=1$ for $j=0$;
$d_j=2$ for $j=1, 2, \ldots$ (M−1);
i, j, m, n, N, M are integers; and
$k_p(j,i)=0$ for |i| or |j|>(k−1)/2 and k is the kernel size This yields equivalent kernel K* in block 252. Next, the equivalent kernel, K*, is truncated to yield a derived kernel matrix as shown in block 254. A DOCT is performed on the derived kernel matrix to return to frequency space and yields a modified filter matrix shown in 256. The RMS between the modified filter matrix of block 256 and the starting filter matrix, F*, in block 250 are then compared to quantify their differences as indicated in block 258. The RMS difference is then compared with a predetermined design figure of merit, FOM, in block 260 and, if the difference is sufficiently small, the size of the kernel, k, has been established. The overlap is then given by the quantity (k−1).

In assessing the nature of the difference between the truncated equivalent spatial kernel, and its retransformed modified kernel matrix, several interations may be made by performing the necessary forward and reverse discrete odd cosine transforms and empirical studies of the quality of the particular image may and/or other figures of merit may be considered.

Mask Multiplication

Each of the frequency-domain submatrices 62 in the resulting array 60 is then mask multiplied by frequency-domain mask matrix 72, or filtered. This is done by a pointwise multiplication of each term $S_{j,i}$ in frequency-domain submatrix 62 with its corresponding term $K_{j,i}$ from frequency-domain mask matrix 72 terms $S'_{j,i}$ where $$S'_{j,i} = S_{j,i} \times K_{j,i}.$$

Figure 10:
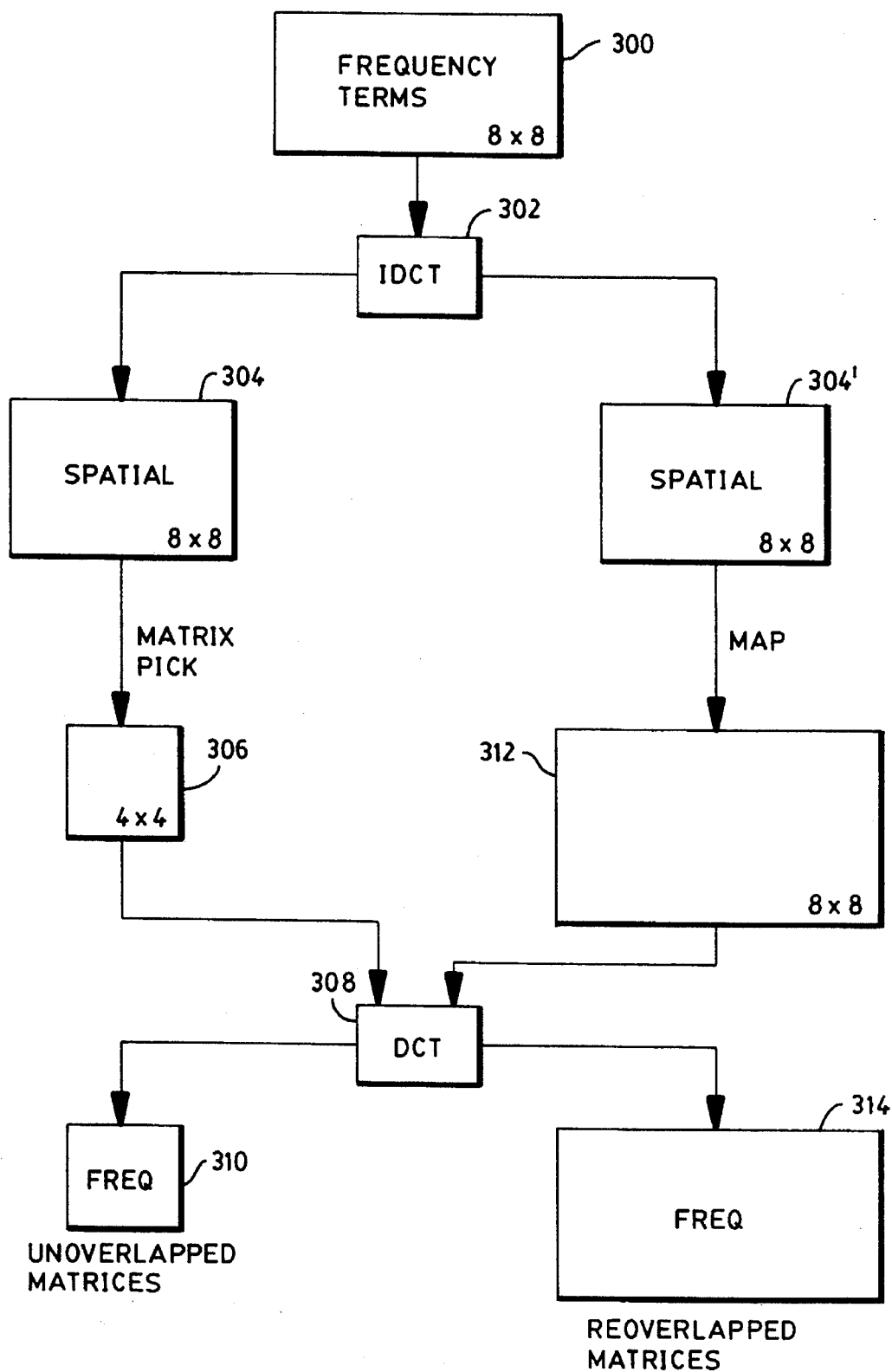
FIG. 10 illustrates the steps taken to either unoverlap or to reoverlap a given matrix.

Input matrix array 300, comprised of frequency terms in 8×8 matrices, for example, is transformed by an IDCT operation at 302 in FIG. 10 into array 304 of 8×8 matrices containing spatial image terms. Because of the mapping performed earlier in the sequence of operations, the matrices in array 304 include redundant or incorrect terms. These are removed by deleting the outer rows (4 total in this example) and outer columns (4 total) of each matrix in array 304 to produce array 306 containing 4×4 matrices. Array 306 is then transformed using the DCT at 308 to yield matrix 310, which is then compatible with a processing standard, such as the JPEG standard.

The reoverlapping of matrix 300 is accomplished first by transforming by using the IDCT at 302 to produce array 304' of 8×8 matrices containing spatial image terms. Array 304' is mapped into array 312 of 8×8 matrices, using the same mapping procedure described above. Array 312 is then transformed at 308, using the DCT, into array 314 of frequency terms.

Hardware Disclosure

Figure 11:
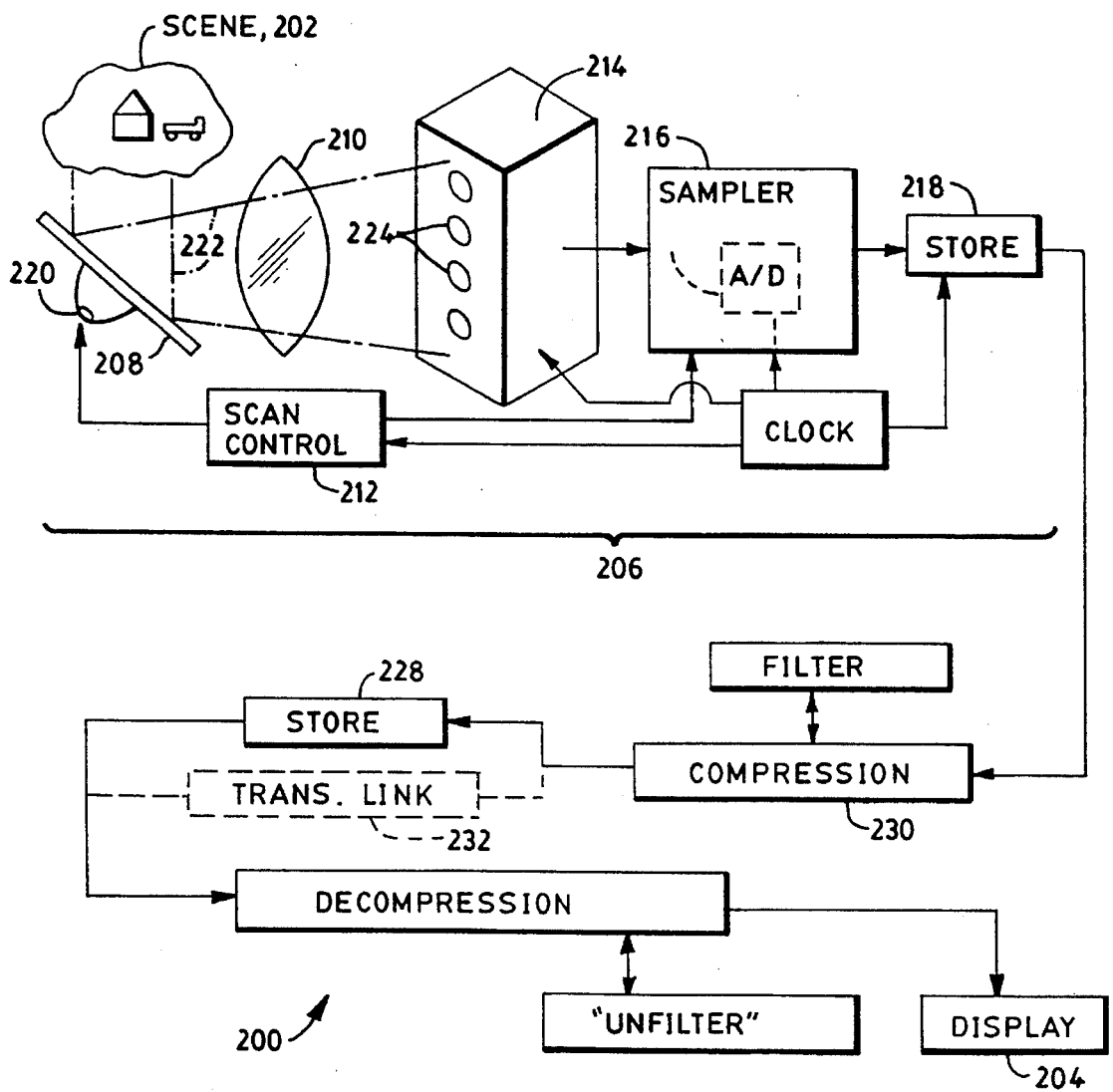
FIG. 11 is a block diagram schematically showing an apparatus for practicing the claimed invention.

FIG. 11 shows a system 200 for presenting an image of a scene 202 upon a display 204. Display 204 may be a printer which prints out the imaging data point by point and, preferably, provides a gray-scale or color representation of each pixel. Alternatively, display 204 may be a cathode ray tube (CRT), liquid crystal display (LCD), or light-emitting diode (LED) display. Image data of scene 202 is gathered by means of an optical scanner 206 which comprises a scanning mirror 208, a lens 210, a scan controller 212, a charge-coupled device (CCD) array detector 214, a sampler 216, and a storage unit 218. Scanner 206 is provided by way of example for acquiring image data by the scanning of either a single line array or a two-dimensional array of photodetectors, where the image data may be obtained in various ways, including the scanning of a photographic slide of scene 202, or from an image produced by a television videocon.

In operation, individual elements or cells of detector 214 detect optical radiation emanating from scene 202. Controller 212 drives mirror 208 in a pivoting movement about an axis 220 whereby rays 222 of the scene radiation are reflected through lens 210 by which the radiation is focused upon a face of detector 214. As mirror 208 pivots, scene 202 is scanned, line-by-line, onto detector 214 where each cell 224 of detector 214 views a scanned line of scene 202. Each cell 224 outputs an analog electric signal in response to detection of incident radiation, where the amplitude of the signal increases with increased intensity of the incident radiation. Cells 224 are arranged in a single line along the face of detector 214 in scanner 206, the line being perpendicular to the plane of scanning. If desired, optical scanner 206 can be replaced by a CCD camera (not shown). Because CCD cells 224 in a camera are arranged in a two-dimensional array of rows and columns, an image of scene 202 could be obtained without requiring a scanning mirror 208.

Sampler 216 is driven by controller 212 in synchronism with the scanning movement of mirror 208 to obtain the signals outputted by detector cells 224. Sampler 216 includes an analog-to-digital convertor 226 which converts the analog signals of detector cells 224 to digitized data samples of an image of scene 202. The digitized samples are outputted by sampler 216 to storage unit 218 for storage therein.

As discussed above, the image data can be compressed prior to the displaying of the data on display 204. This may be done to facilitate data storage or data transmission, or both. Data storage in a storage unit 228 may comprise a magnetic medium, an optical disk, or may be in the form of a solid-state read-only memory. Additionally, any of these methods can be configured into a card for ease in handling by a user. In this way, image data which has conventionally been outputted as a photograph may be stored on the card in accordance with the invention.

The digitized samples outputted from storage unit 218 are compressed by data compression section 230. The invention can also be practiced with a transmission link 232, indicated in phantom, if it is desired to electronically transmit data from scanner 206 to display 204. In such an application, compression of the image data facilitates the electronic transmission of the data. Transmission link 232 can be a telephone circuit, a satellite communication link, or any other suitable form of communication system.

What is claimed is:

1. A method of processing an image signal, including filtering by means of a spatial-domain kernel, comprising the steps of:

acquiring the image signal, said image signal formatted as a series of electrical signals corresponding to image element characteristics;

transforming said series of electrical signals into a set of image data, said set of image data formatted as an H×V matrix, having terms denoted by $s_{j,i}$, where $0 \leq i \leq (H-1)$ and $0 \leq j \leq (V-1)$;

generating a P×Q array of N×N image-data submatrices from said set of image data, where $N \leq H$, $N \leq V$, $P \geq int(H/N)$ and $Q \geq int(V/N)$, each said image-data submatrix having terms denoted by $x_{v,\mu}$, where $0 \leq \mu$, $v \leq (N-1)$, wherein each said image datum is mapped into at least one of said image-data submatrices, and further wherein each said image-data submatrix has at least one row or one column identical to a row or column of an adjacent image-data submatrix;

performing a DECT on each said image-data submatrix to obtain a P×Q array of N×N frequency-domain submatrices, each said frequency domain submatrix having terms denoted by $X_{v,\mu}$;

acquiring the spatial-domain kernel, said kernel formatted as a symmetrical f×f matrix, where f<N;

constructing an N×N kernel matrix from said spatial-domain kernel, with terms denoted by $k_{v,\mu}$, wherein each kernel matrix term is either assigned a value equal to a term in said spatial-domain kernel or else is set to zero;

performing a DOCT on said kernel matrix to obtain an N×N frequency-domain mask matrix, having terms denoted by $F_{v,\mu}$;

filtering said frequency-domain submatrix by performing a pointwise multiplication of each said frequency-domain submatrix with said frequency-domain mask matrix to yield a P×Q array of N×N filtered frequency-domain matrices, having terms denoted by $X'_{v,\mu}$ wherein $$X'_{v,\mu} = F_{v,\mu} \times X_{v,\mu};$$

unoverlapping said filtered frequency-domain matrices to obtain a P×Q array of N'×N' filtered frequency-coefficient matrices; and performing a quantization operation on the terms in said filtered frequency-coefficient matrices to obtain a P×Q array of N'×N' quantized filtered frequency-coefficient matrices; where N'<N, said quantized filtered frequency-coefficient matrices comprising a compressed set of filtered image data which is functionally equivalent to the DCT of the convolution of said set of image data with said spatial-domain kernel, wherein said compressed set of filtered image data can be stored using a digital signal processor or similar electronic circuitry, or encoded and transmitted by electronic means, whereby said compressed set of filtered image data can be subsequently electronically reprocessed to regenerate a processed image signal, corresponding to the original image signal, without incurring blocking artifacts.

2. The method of claim 1 wherein said step of generating a P×Q array of N×N image-data submatrices further comprises the steps of:

a.) determining a stepping-increment integer Δ, where $\Delta \leq N$; and b.) mapping each term of the image data set $\{s_{j,i}\}$ into at least one of said image-data submatrices, the terms $x_{v,\mu}$ of said image-data submatrix in the p-th column and the q-th row of said P×Q array being defined by the expression $$x_{v,\mu} = x_{v+q\Delta, \mu+p\Delta},$$

where $0 \leq p \leq (P-1)$ and $0 \leq q \leq (Q-1)$.

3. The method of claim 2 wherein said step of determining a stepping-increment Δ comprises the steps of:

a.) selecting an overlap factor Λ, wherein $\Lambda = (N-f)$;

b.) evaluating an error function, expressible as $g(\Lambda)$, against a pre-established criterion; and c.) setting Δ equal to $(N-\Lambda)$ if said criterion is met, otherwise incrementing Λ by one and repeating said steps of evaluating an error function and setting Δ equal to $(N-\Lambda)$ if said criterion is met otherwise incrementing Λ by one, until said criterion is met.

4. The method of claim 1 wherein said step of unoverlapping said filtered frequency-domain matrices comprises the steps of:

a.) applying an Inverse Even DCT to each said filtered frequency-domain matrix to obtain a P×Q array of N×N inverse-even coefficient matrices;

b.) applying a "matrix pick" operation to each said inverse-even coefficient matrix to obtain a P×Q array of N'×N' reduced matrices such that said reduced matrices do not contain redundant matrix terms found in said inverse-even coefficient matrices; and c.) applying a Forward DCT to each said reduced matrix to obtain a P×Q array of N'×N' filtered frequency-coefficient matrices.

5. A method of processing an image signal, including filtering by means of a set of frequency coefficients, comprising the steps of:

acquiring the image signal, said image signal formatted as a series of electrical signals corresponding to image element characteristics;

transforming said series of electrical signals into a set of image data, said set of image data formatted as an H×V matrix, having terms denoted by $s_{j,i}$, where $0 \leq i \leq (H-1)$ and $0 \leq j \leq (V-1)$;

acquiring the set of frequency coefficients, said set of frequency coefficients formatted as an N*×N* frequency-coefficient matrix;

determining a stepping-increment integer Δ comprising the steps of:

a.) performing a matrix multiplication of said frequency-coefficient matrix with an inverse DOCT matrix to obtain an N*×N* modified frequency coefficient matrix, b.) performing a matrix multiplication of said modified frequency-coefficient matrix with a transposed inverse DOCT to obtain an N*×N* equivalent kernel matrix, c.) truncating said equivalent kernel matrix to obtain an f*×f* derived kernel matrix, where $f^* \leq N^*$, and d.) selecting stepping-increment Δ to be given by $(N-f^*+1)$;

generating a P×Q array of N×N image-data submatrices, where $P \geq int(H/N)$ and $Q \geq int(V/N)$ and where $N \leq H$ and $N \leq V$, each said image-data submatrix having terms denoted by $x_{v,\mu}$, where $0 \leq \mu, v \leq (N-1)$, wherein each image datum is mapped into at least one of said image-data submatrices, and further wherein each said image-data submatrix has at least $(N-\Delta)$ row(s) or $(N-\Delta)$ column(s) identical to $(N-\Delta)$ row(s) or column(s) of an adjacent image-data submatrix;

constructing an N×N frequency-domain mask matrix, from said frequency-coefficient matrix, having terms denoted by $F_{\nu,\mu}$, wherein each frequency-domain mask matrix term is either assigned a value equal to a term in said frequency-coefficient matrix or else is set to zero;

performing a DECT on each said image-data submatrix to obtain a P×Q array of N×N frequency-domain submatrices, each said frequency domain submatrix having terms denoted by $X_{\nu,\mu}$;

filtering said frequency-domain submatrix by performing a pointwise multiplication of each said frequency-domain submatrix with said frequency-domain mask matrix to yield a P×Q array of N×N filtered frequency-domain matrices, having terms denoted by $X'_{\nu,\mu}$ wherein $$X'_{\nu,\mu}=F_{\nu,\mu}\times X_{\nu,\mu};$$

unoverlapping said filtered frequency-domain matrices to obtain a P×Q array of N'×N' filtered frequency-coefficient matrices; and performing a quantization operation on the terms in said filtered frequency-coefficient matrices to obtain a P×Q array of N'×N' quantized filtered frequency-coefficient matrices; where N'≦N, said quantized filtered frequency-coefficient matrices comprising a compressed set of filtered image data which can be stored using a digital signal processor or similar electronic circuitry, or encoded and transmitted by electronic means, whereby said compressed set of filtered image data can be subsequently electronically reprocessed to regenerate a processed image signal, corresponding to the original image signal, without incurring blocking artifacts.

6. The method of claim 5 wherein said step of generating a P×Q array of N×N image-data submatrices further comprises the step of deriving the terms $x_{\mu,\nu}$ of the image-data submatrix in the p-th column and the q-th row of said P×Q array in accordance with the expression $$x_{\nu,\mu}=s_{\nu+q\alpha,\mu+p\Delta}$$

where $0\leq p\leq(P-1)$ and $0\leq q\leq(Q-1)$.

7. The method of claim 5 wherein said step of determining a stepping-increment integer Δ further comprises the steps of:

a.) selecting an overlap factor Λ given by (N–Δ);

b.) evaluating an error function, expressible as g(Λ), against a pre-established criterion;

c.) incrementing Λ by one and repeating step (b) if said criterion is not met; and d.) setting Δ equal to (N–Λ) when said criterion is met.

8. The method of claim 5 wherein said step of unoverlapping said filtered frequency-domain matrices comprises the steps of a.) applying an Inverse Even DCT to each said filtered frequency-domain matrix to obtain a P×Q array of N×N inverse-even coefficient matrices having terms denoted by $\Theta_{\nu,\mu}$;

b.) applying a "matrix pick" operation to each said inverse-even coefficient matrix to obtain a P×Q array of N'×N' reduced matrices such that reduced matrices do not contain redundant matrix terms found in said inverse-even coefficient matrices; and c.) applying a Forward DCT to each said reduced matrix to obtain a P×Q array of N'×N' filtered frequency-coefficient matrices.

9. The method of claim 8 wherein said step of applying a "matrix pick" operation further comprises the steps of:

a.) comparing each term $\Theta_{\nu,\mu}$ to at least one predetermined criterion; and b.) mapping those terms meeting said at last one predetermined criterion into said N'×N' reduced matrix.

10. A method of processing an image signal, including filtering by means of a set of frequency coefficients, said method comprising the steps of:

acquiring the image signal, said image signal formatted as a series of electrical signals corresponding to image element characteristics;

transforming said series of electrical signals into a set of image data, said set of image data formatted as an H×V matrix;

acquiring the set of frequency coefficients, said set of frequency coefficients formatted as a symmetrical N*×N* frequency-coefficient filter matrix;

transforming said N*×N* frequency,coefficient matrices into N'×N' equivalent kernel matrices by means of a DOCT;

deriving a stepping-increment integer Δ as a function of N' such that an overlap amount (N–Δ) can be determined;

generating an array of overlapped N×N image-data submatrices from said H×V matrix, such that each said image-data submatrix has at least (N–Δ) row(s) or column(s) of terms identical to (N–Δ) row(s) or column(s) of an adjacent image-data submatrix;

performing a DECT on said overlapped image-data matrices to obtain N×N frequency-domain matrices; and filtering at least one said frequency-domain submatrix by performing a pointwise multiplication of said at least one frequency-domain submatrix with at least a portion of said frequency-coefficient filter matrix.

11. An apparatus for performing a convolution of a set of image data with a spatial-domain kernel, said apparatus comprising:

means for acquiring the set of image data, the set of image data formatted as an H×V matrix, having digitized data sample terms denoted by $s_{j,i}$, where $0\leq i\leq(H-1)$ and $0\leq j\leq(V-1)$;

means for acquiring the spatial-domain kernel, the kernel formatted as a symmetrical f×f matrix;

means for generating an array of overlapped image-data submatrices from the set of image data, each said overlapped image-data submatrix having at least one row or one column of terms identical to a row or column of terms of an adjacent image-data submatrix;

means for constructing a kernel matrix from the spatial-domain kernel, each term in said kernel matrix either assigned a value equal to a term in the spatial-domain kernel or else set to zero;

means for performing a DECT on each said image-data submatrix to obtain a frequency-domain submatrix;

means for performing a DOCT on said kernel matrix to obtain a frequency-domain mask matrix;

means for filtering said frequency-domain submatrices by performing a pointwise multiplication of each said frequency-domain submatrix with said frequency-domain mask matrix to yield an array of filtered frequency-domain matrices;

means for unoverlapping said array of filtered frequency-domain matrices to obtain an array of filtered frequency-coefficient matrices; and means for performing a quantization operation on terms in said filtered frequency-coefficient matrices.

* * * * *